UNITED STATES PATENT OFFICE.

TERTIUS S. NORTON, OF CHICOPEE, MASSACHUSETTS.

IMPROVED PROCESS FOR STEEL-FACING VISES.

Specification forming part of Letters Patent No. 52,878, dated February 27, 1866.

*To all whom it may concern:*

Be it known that I, TERTIUS S. NORTON, of Chicopee, in the county of Hampden and State of Massachusetts, have invented a new and useful Improvement in Steel-Facing Vises and Various other Articles of Iron; and I do hereby declare the same to be fully described in the following specification.

The purpose of my invention is to affix a piece of steel to the jaw of the vise, or to a piece of metal, by brazing the two together and still retain the brazing metal in place during the operation of hardening the said piece of steel; my invention also being applicable to pliers, cutting-nippers, and various mechanical implements.

In carrying out my invention the piece or facing of steel is to be brazed to the vise-jaw or piece of iron in the usual way—that is to say, by applying borax or other suitable flux to the surfaces which are to be connected, and laying one or more pieces of brass on the joint, and subjecting the whole to such a heat as will melt the brass and cause it to flow between the said surfaces.

After the parts may have been connected together the steel will be in a soft state—that is, in a state in which it can be filed. In this condition of the steel I usually file and grind or finish the article and its facing; but this is only preparatory to the application of the remainder of my invention, or the process of hardening the steel and maintaining the brazing metal in its place while such hardening of the steel may be in the act of being effected.

In order to keep the brazing in place I employ, during the process of hardening the steel facings, a means of pressing the facing hard against the brazing, so as to hold the said brazing firmly in position between the connected surfaces when it may be in a melted or fluid state, caused by reheating the steel. Under this condition of things I heat the facing to the required temperature and plunge it into water or oil, where it will become hard, and the brazing will again become set.

In the process of hardening the steel jaws of a vise, the screw of the vise by which the jaws are operated may be used to draw the steel faces into close contact, and so as to hold the brazing in place during the carrying out of the hardening process.

I would remark that while, by my present process, I am enabled to accomplish the result of my process as recently patented by me, I can employ a much higher temperature in the hardening of the steel, and I have the very important advantage of being able to file and finish the facing while in a soft state.

In hardening the steel face of an ordinary tool—as a chisel, for instance—when the face is brazed to the iron body, I make use of such a clamp or such clamping devices as will serve to keep the parts so closely together as to prevent the loss or displacement of the brazing while the article may be at a hardening temperature, or in the act of being heated to such.

I do not claim the brazing process of itself; neither do I claim the hardening of steel by heating it and subsequently suddenly cooling it; but What I do claim as my invention is—

The combination of the two processes of brazing and hardening the piece of steel or facing with that of so firmly holding the facing-piece of steel to the iron while the hardening process is being carried on as to prevent the displacement or escape of the brazing metal from between the contiguous surfaces against which it may be.

TERTIUS S. NORTON.

Witnesses:
R. H. EDDY,
F. P. HALE, Jr.